(12) United States Patent
Mitchell et al.

(10) Patent No.: US 7,809,269 B2
(45) Date of Patent: Oct. 5, 2010

(54) SYSTEMS AND METHODS FOR MULTIPLEXING QKD CHANNELS

(75) Inventors: J. Howell Mitchell, Amherst, NH (US); Harry Vig, North Billerica, MA (US)

(73) Assignee: MagiQ Technologies, Inc., Somerville, MA (US)

( * ) Notice: Subject to any disclaimer, the term of this patent is extended or adjusted under 35 U.S.C. 154(b) by 860 days.

(21) Appl. No.: 11/660,712

(22) PCT Filed: Aug. 23, 2005

(86) PCT No.: PCT/US2005/029893

§ 371 (c)(1),
(2), (4) Date: Feb. 21, 2007

(87) PCT Pub. No.: WO2006/028695

PCT Pub. Date: Mar. 16, 2006

(65) Prior Publication Data

US 2007/0258592 A1    Nov. 8, 2007

Related U.S. Application Data

(60) Provisional application No. 60/607,540, filed on Sep. 7, 2004.

(51) Int. Cl.
*H04L 9/00* (2006.01)
*H04K 3/00* (2006.01)
(52) U.S. Cl. ........................... 398/79; 398/149; 380/256
(58) Field of Classification Search ................... 398/79, 398/149; 380/256
See application file for complete search history.

(56) References Cited

U.S. PATENT DOCUMENTS

| 5,003,268 | A | * | 3/1991 | Tsuchiya | 359/345 |
| 5,675,648 | A | * | 10/1997 | Townsend | 380/278 |
| 5,757,912 | A | * | 5/1998 | Blow | 380/256 |

(Continued)

FOREIGN PATENT DOCUMENTS

EP    0 803 139 B1    11/1998

OTHER PUBLICATIONS

Mu et al., "convergence of the chirped return-to-zero and dispersion managed soliton modulation formats in WDM systems," J. Lightwave Tech., vol. 20, No. 4 Apr. 2002.

(Continued)

*Primary Examiner*—Ken N Vanderpuye
*Assistant Examiner*—Tanya Ngo
(74) *Attorney, Agent, or Firm*—Opticus IP Law PLLC

(57) ABSTRACT

Systems and methods for multiplexing two or more channels of a quantum key distribution (QKD) system are disclosed. A method includes putting the optical public channel signal (SP1) in return-to-zero (RZ) format in a transmitter (T) in one QKD station (Alice) and amplifying this signal (thereby forming SP1*) just prior to this signal being detected with a detector (30) in a receiver (R) at the other QKD station (Bob). The method further includes precisely gating the detector via a gating element (40) and a coincident signal (PN1') with pulses that coincide with the expected arrival times of the pulses in the detected (electrical) public channel signal (SP2). This allows for the public channel signal to have much less power, making it more amenable for multiplexing with the other QKD signals.

5 Claims, 2 Drawing Sheets

U.S. PATENT DOCUMENTS

| | | | |
|---|---|---|---|
| 5,953,421 A * | 9/1999 | Townsend | 380/283 |
| 6,115,416 A * | 9/2000 | Katsman et al. | 375/224 |
| 6,239,893 B1 | 5/2001 | Bigo et al. | |
| 6,438,234 B1 | 8/2002 | Gisin et al. | |
| 7,242,774 B1 * | 7/2007 | Elliott et al. | 380/256 |
| 7,248,695 B1 * | 7/2007 | Beal et al. | 380/256 |
| 7,359,514 B2 * | 4/2008 | Trifonov et al. | 380/256 |
| 7,436,961 B2 * | 10/2008 | Mitchell et al. | 380/256 |
| 7,437,081 B2 * | 10/2008 | Mitchell et al. | 398/154 |
| 7,627,126 B1 * | 12/2009 | Pikalo et al. | 380/279 |
| 2003/0231771 A1 * | 12/2003 | Gisin et al. | 380/255 |
| 2004/0005000 A1 * | 1/2004 | Shake et al. | 375/228 |
| 2005/0213696 A1 * | 9/2005 | Totsuka et al. | 375/376 |
| 2006/0045527 A1 * | 3/2006 | Maeda et al. | 398/79 |
| 2008/0273703 A1 * | 11/2008 | LaGasse | 380/278 |

OTHER PUBLICATIONS

Hughes et al, "Quantum key distribution of a 48 km optical fibre network," J. Mod. Opt., 200 vo. 47, No. 2/3, 533-547.

* cited by examiner

SYSTEMS AND METHODS FOR MULTIPLEXING QKD CHANNELS

CLAIM OF PRIORITY

This application claims the benefit of priority under 35 U.S.C. §119(e) of U.S. Provisional Patent Application Ser. No. 60/607,540, filed on Sep. 7, 2004.

TECHNICAL FIELD OF THE INVENTION

The present invention relates to and has industrial utility with respect to quantum cryptography, and in particular relates to and has industrial utility with respect to multiplexing different channels of a QKD system onto a single optical fiber.

BACKGROUND OF THE INVENTION

Quantum key distribution involves establishing a key between a sender ("Alice") and a receiver ("Bob") by using weak (e.g., 0.1 photon on average) pulsed optical signals transmitted over a "quantum channel." The security of the key distribution is based on the quantum mechanical principle that any measurement of a quantum system in unknown state will modify its state. As a consequence, an eavesdropper ("Eve") that attempts to intercept or otherwise measure the quantum signal will introduce errors into the transmitted signals and reveal her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in U.S. Pat. No. 5,307,410 to Bennett, and in the article by C. H. Bennett entitled "Quantum Cryptography Using Any Two Non-Orthogonal States", Phys. Rev. Lett. 68 3121 (1992). The general process for performing QKD is described in the book by Bouwmeester et al., "The Physics of Quantum Information," Springer-Verlag 2001, in Section 2.3, pages 27-33.

The performance of a QKD system can be degraded by noise in the form of photons generated by three different mechanisms. The first is forward Raman scattering, in which frequency-shifted photons are generated and co-propagate with the quantum signal photons. Raman scattering in an optical fiber limits the power that can be put into a single fiber because of a transfer of energy from a high power signal to the single-photon wavelength.

The second mechanism is Raman backscattering, in which frequency-shifted photons are generated and propagate in the opposite direction to the quantum signal photons.

The third mechanism is Rayleigh scattering, in which photons are elastically scattered back in the opposite direction of the quantum signal photons.

The scattering of light in an optical fiber—and particular forward Raman scattering—is problematic in multiplexing the different channels of a QKD system because of the noise it creates in the detection process.

Two simple solutions have been proposed to overcome the effects of light scattering in combining different channels onto a single optical fiber. The first solution is to use one fiber for the public discussion channel, possibly the sync channel as well, and a second fiber for the quantum channel. The second solution is to limit the fiber length so that the input power can be reduced, and so the scattering power transfer ratio is lower with the shorter distance. Both of these solutions, while simple, are also unappealing because they are not particularly robust and are ill-suited for a commercially viable QKD system.

The prior art relating to multiplexing the different channels associated with QKD includes U.S. Pat. No. 6,438,234 ("the '234 patent"). In the '234 patent, the sync signal is time-multiplexed with the quantum channel. The prior art also includes U.S. Pat. No. 5,675,648 ("the '648 patent). The '648 patent proposes the idea of having a "common transmission medium" (i.e., an optical fiber) for the quantum channel and the public channel, where the public channel also carries a calibration signal.

However, the prior art does not address the daunting problem of combining the relatively strong public and sync channels with the very weak quantum channel. In particular, the '648 patent does not address how the public channel can be multiplexed with the quantum channel in the "common transmission medium" in a way that will not interfere with detecting the single-photons associated with the quantum channel.

Also, in the '234 patent, a sample-and-hold type of phase lock loop needs to be implemented to hold the sync timing while working on single photons. However, the difficulties of multiplexing sync and quantum channel are less challenging than the task of multiplexing the public (data) channel and the quantum channel. The '234 patent does not address the issue of transmitting the public channel and the quantum channel over the same optical fiber.

The publication "Eighty kilometer transmission experiment using an InGaAs/InP SPAD-based quantum cryptography receiver operating at 1.55 um" by P. A. Hiskett, G. Bonfrate, G. S. Buller, and P. D. Townsend, published in the *Journal of Modern Optics*, 2001, vol. 48, no. 13, pp. 1957-1966, suggests an approach to combining the sync and quantum channels. The light from the transmitter laser is split into a quantum signal and a sync signal. The sync signal is sent over a separate fiber and upon entering the receiver is amplified by an erbium doped fiber amplifier (EDFA). After the amplified light signal is converted into electrical signal, the electrical signal is used to gate the receiver's detector.

It would be desirable to wavelength-multiplex 10 MHz Ethernet public discussion traffic (i.e., the public channel) onto the same fiber as the sync and quantum channels. However, the optical power of the Ethernet public channel signal must be significantly reduced to prevent scattering and other such interference that reduces the ability to detect the channels. Unfortunately, reducing the public channel power results in an unacceptably low signal-to-noise ratio for the public channel for any QKD system with a satisfactory distance or span. While the use of an optical fiber amplifier (e.g., an erbium-doped fiber amplifier or EDFA) can increase the amplitude of the optical signal and remove the need for a narrow band optical filter, its output will still have a very low signal to noise ratio.

SUMMARY OF THE INVENTION

The present invention includes systems and methods for multiplexing two or more channels of a quantum key distribution (QKD) system. The systems and method result in reduced detection noise for the public channel, thereby allowing weaker public channel signal to be used. Use of a weaker public channel signal enables multiplexing the public channel with the quantum channel and/or the sync channel on the same optical fiber for a commercially viable QKD system.

An aspect of the invention is a method that includes putting the optical public channel signal in return-to-zero (RZ) format and amplifying this signal just prior to it being detected. The method further includes precisely gating the detector to coincide with the expected arrival times of the pulses in the detected (electrical) public channel signal to reduce the detection noise. The method also includes forming a first signal comprising a train of pulses that is frequency-locked with the electrical public channel signal, and then applying a selective delay to the first signal so that the first signal coincides (in time) with the electrical public channel signal. The first signal is then used to gate the detector.

This method serves to drastically reduce the noise associated with the detection of the public channel, which in turn allows for a weaker public channel signal to be used. Use of a weaker public channel signal is what enables multiplexing the public channel with the quantum channel and/or the sync channel on the same optical fiber.

The method is generally applicable to detecting a weakened Ethernet signal that would otherwise be difficult to detect.

Another aspect of the invention is a method of combining a public channel signal (SP1) of a first wavelength and a quantum channel signal (SQ) of a second wavelength on an optical fiber connecting first and second quantum key distribution (QKD) stations (Alice and Bob). The method includes providing signal SP1 in a return-to-zero (RZ) format and multiplexing and transmitting signals SP1 and SQ from Alice to Bob. The method also includes wavelength-demultiplexing signals SP1 and SQ at Bob and optically amplifying signal SP1 to form an optically amplified signal SP1*. The method also includes detecting signal SP1* to create a public channel electrical signal SP2 and forming from this signal a signal PN1' that comprises electrical pulses that are frequency-locked and coincident (in time) with signal SP2. Finally, the method includes using signal PN1' to gate the detecting of signals SP1*.

Figure 1:
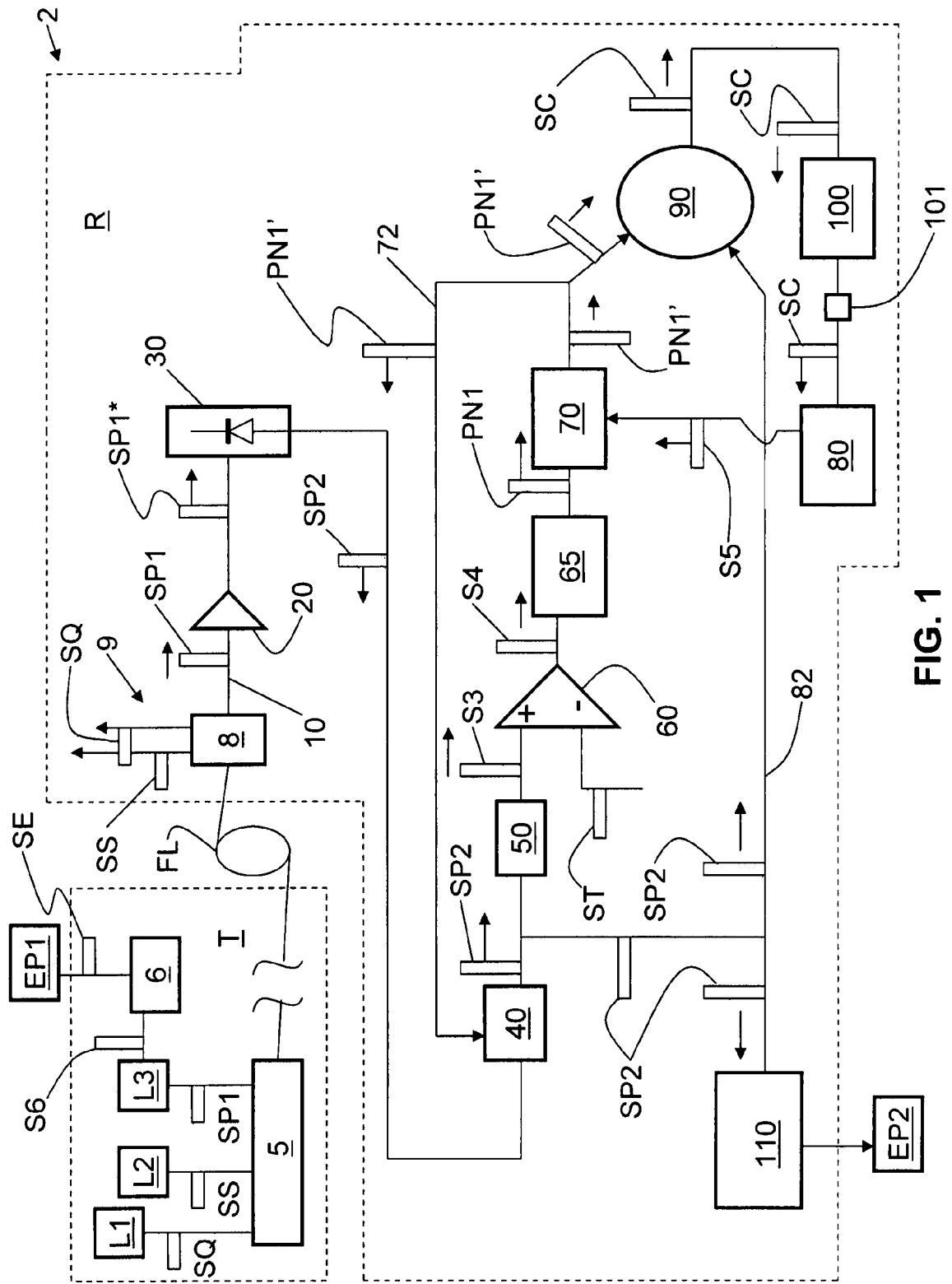
FIG. 1 is a schematic diagram of a transmitter-receiver (T-R) system for use with QKD stations of a QKD system in order to effectively transmit the public channel along with the quantum channel and/or the sync channel on the same optical fiber.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

DETAILED DESCRIPTION OF THE INVENTION

The present invention relates to quantum cryptography, and in particular relates to systems and methods that allow for select channels of a QKD system, such as the public discussion channel, the synchronization ("sync") channel and/or the quantum channel, to be multiplexed on to a single optical fiber. In the discussion herein, the quantum channel carries the quantum signal, which is a single-photon optical pulse. The term "single photon" is meant to encompass optical pulses having one photon or less on average.

The sync channel as discussed herein carries synchronization data (signals), and optionally, calibration data (signals) that allows for the coordinated operation between the two QKD stations, which are typically denoted as Bob and Alice.

Also in the discussion below, the terms "signal" and "pulse" are used interchangeably in a manner that will be apparent to those skilled in the art. Also, the terms "public channel signal" and "quantum signal" are each understood as including one or more pulses, e.g., a train of pulses.

For commercial QKD systems, there is a strong desire to use an existing optical fiber to carry two or more of the QKD channels between QKD stations. The present invention enables carrying all three of the above-mentioned channels on a relatively long optical fiber (e.g., 50 km to 100 km) normally associated with a commercially viable QKD system.

Note that in a typical QKD system, the two QKD station are referred to as "Alice" and "Bob," and transmission occurs over the QKD channel in one direction, i.e., from Alice to Bob. However, in connection with an Ethernet public discussion channel, Alice and Bob are identical peers. That is, in order to support the Ethernet-related protocols (e.g. TCP/IP) over the public channel, bi-directional communication is required. This, in turn, means that Alice and Bob each contain a receiver R and a transmitter T, as discussed below.

QKD System

Figure 2:
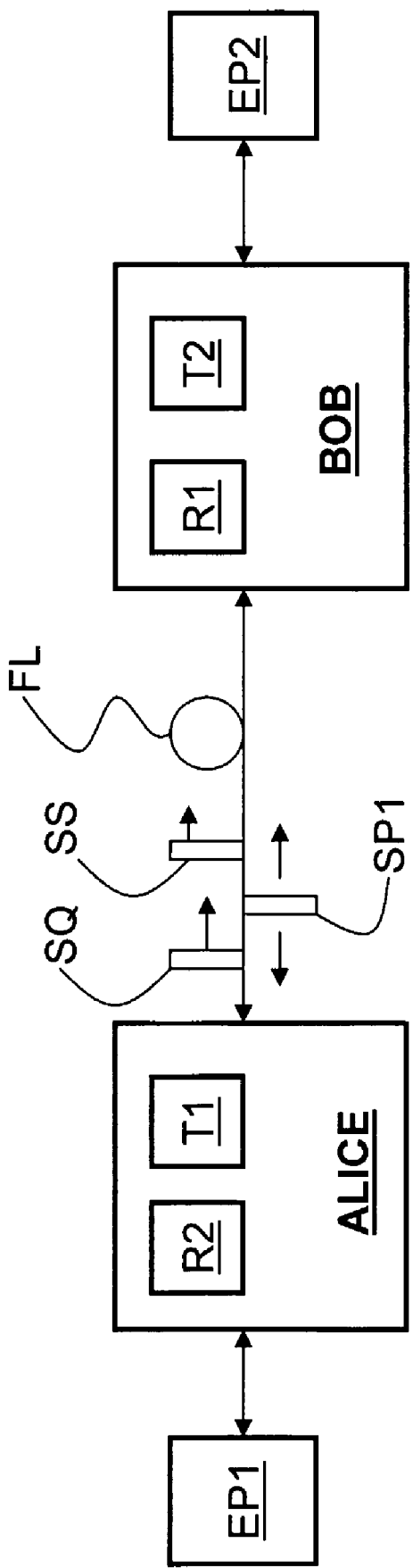
FIG. 2 is a schematic diagram of a QKD system with two QKD stations Alice and Bob showing how the T-R system is used in a QKD system, wherein Alice has a transmitter T1 and a receiver R2, and Bob has a transmitter T2 and a receiver R1, so that two-way communication over the public channel is enabled by T1-R1 and T2-R2.

FIG. 1 is a schematic diagram of an example embodiment of a transmitter-receiver (T-R) system 2 according to the present invention. The T-R system 2 includes a QKD station transmitter T that is coupled to a QKD station receiver R by an optical fiber link FL. FIG. 2 illustrates how the T-R system is incorporated into a QKD system as two systems T1-R1 and T2-R2 to achieve bi-directional public channel communication, as described in greater detail below.

The transmitter T includes three light source systems L1, L2 and L3 operating at respective wavelengths $\lambda 1$, $\lambda 2$ and $\lambda 3$. Light source systems L1, L2 and L3 are respectively adapted to generate corresponding quantum signal SQ, sync signal SS and public channel signal SP1. For example, light source system L3 is adapted to provide the public channel signal SP1 in a variety of formats, including return-to-zero (RZ) format. Light source systems L1, L2 and L3 are optically coupled with and wavelength-multiplexed onto fiber link FL via a wavelength-division multiplexer 5.

In an example embodiment, the transmitter T includes an RZ encoder 6 that accepts an industry-standard 10 MHz Ethernet Manchester-encoded signal SE from an Ethernet port EP1. RZ encoder 6 converts signal SE to narrow, low-duty-cycle pulses S6. Signals S6 are then used to drive light source system L3 in order to generate relative low-power optical public channel signals SP1 that have a 10-MHz-Ethernet RZ format.

With continuing reference to FIG. 1, receiver R includes a wavelength-division demultiplexer 8 optically coupled to optical fiber link FL. Demultiplexer 8 is adapted to separate optical signals SQ, SS and SP1 with wavelengths $\lambda 1$, $\lambda 2$ and $\lambda 3$, into separate optical paths, e.g., separate optical fiber sections. The two optical paths associated with quantum signal SQ at wavelength $\lambda 1$ and sync signal SS at wavelength $\lambda 2$ are indicated by 9. The third optical path associated with the public channel signal SP1 and wavelength $\lambda 3$ is indicated by 10.

Note that in FIG. 1, the details of quantum channel and the sync channel apparatus are not shown in transmitter T and receiver R and because they are not critical to the understanding of the invention and are based on known art.

T-R system 2 of FIG. 1 further includes along optical path 10 (e.g., optical fiber section 10) downstream of wavelength-division multiplexer 8 an optical amplifier 20, such as an erbium-doped fiber amplifier (EDFA). Optical amplifier 20 is adapted to optically amplify optical public channel signal SP1 to form an amplified optical public channel signal SP1* just prior to or soon after signal SP1 enters receiver R. Optical amplifier 20 is shown within the receiver in FIG. 1 for the sake of illustration.

Downstream of optical amplifier 20 is a detector 30 (e.g., a PIN photodiode) operably coupled to the optical amplifier, and a gating element ("gate") 40 (i.e., a fast on-off switch) downstream and operably coupled to detector 30. The output of gate 40 is coupled to a filter 50, which in the present example is a 10 MHz narrow-bandpass filter.

The output of filter 50 is operably coupled to one input of a high-speed comparator 60. The other input of comparator 60 is provided with a threshold signal ST. The output of comparator 60 is coupled to a multi-vibrator 65 (e.g., a one-shot or mono-stable multi-vibrator). The output of multi-vibrator 65 is coupled to a variable delay 70, which is controlled by a programmable controller 80 operatively coupled to the delay. In an example embodiment, controller 80 includes a field-programmable gate array (FPGA). The output of variable delay 70 is also coupled to gate 40 via line 72.

One of the outputs from variable delay 70 is connected to one input port of a multiplier 90, while an input line 82 is coupled to the other multiplier port. Line 82 carries the public channel signals (pulses) SP2 that make it through gate 40, as discussed below. The output of multiplier 90 is sent to the input of a low-pass filter 100, whose output is connected to an input of controller 80. Controller 80 then controls the variable delay 70, which has an output to gate 40.

As mentioned above, in an example of the present invention, public channel signal SP1 is a 10 MHz Ethernet Manchester-encoded data stream re-coded into an RZ format with very narrow RZ pulses. This allows the output of optical amplifier 20 to be gated (or enabled) via variable delay 70 to the multiplier (90) only when the RZ pulses might be present. The presence of a narrow pulse represents a data bit of "1" and the lack of a narrow pulse represents a "0". The narrow RZ pulses occur only on the Ethernet 10 MHz square wave edges.

The gating of the optical amplifier output significantly reduces the noise in the public channel signal detection process. However, such gating requires that the time slots where the narrow RZ pulses occur be known. Fortunately, the frequency of the public channel signals is known to within 100 PPM (Parts Per Million), as is consistent with the IEEE 802.3 standard. This information is used to produce the required detector gating signal in the manner described below.

Method of Operation

An example embodiment of the present invention uses a non-return-to-zero (NRZ) Manchester-encoded and industry-standard 10 MHz Ethernet signal and converts it to an RZ format using RZ encoder 6. The resulting RZ public channel signal SP1 is then sent over the public channel, as mentioned above. Public channel signal SP1 is multiplexed with the quantum and sync channel signals SQ and SC via multiplexer 5, and sent over to receiver R via optical fiber link FL. The public channel signal S1 is then demultiplexed from the quantum signal and sync signals (not shown) by demultiplexer 8 and is amplified by optical amplifier 20 to form amplified public channel signal SP1*. The amplified signal SP1* is then detected by detector 30, which converts this signal into a corresponding electrical public signal SP2.

The electrical public signal SP2 passes through gate 40 (whose operation is discussed below) and travels to filter 50 (e.g., a 10 MHz bandpass filter). Filter 50 creates a (10 MHz) sine-wave signal S3 that is frequency-locked to the incoming Ethernet RZ data (i.e., electrical public signal SP2).

High-speed comparator 60 receives sine-wave signal S3 at the "+" input and the threshold signal ST at the "−" input, and converts signal S3 to a (10 MHz) square wave signal S4 at the comparator output. The square-wave signal S4 then passes to multi-vibrator 65, which converts the signal to a train of narrow electrical signals (pulses) PN1. The pulse width of multi-vibrator 65 is preferably as great or slightly greater than the width of signal SP2 that travels through gate 40.

Pulses PN1 enter delay 70, whose delay is selectively controlled by programmable controller 80. It is the job of controller 80 to impart a selective delay to pulses PN1 so they fall directly on top of (i.e., are coincident in time with) the incoming narrow Ethernet RZ signals SP2. For the sake of clarity, the train of selectively delayed pulses created by delay 70 are referred to as signal PN1'.

Signal PN1' from variable delay 70 is multiplied with the incoming RZ Ethernet pulses (i.e., electrical public channel signal SP2) from input line 82 at multiplier 90. Multiplier 90 creates a cross-correlation function signal SC from the two multiplier input signals. Signal SC is provided to controller 80 through a low-pass filter 100. In an example embodiment, it is assumed that controller 80 makes changes to the delay values slowly, because quick changes could result in closed-loop instability. The controller only needs to initially acquire and then track the input pulse train (i.e., signal SP2), neither of which requires a quick response. The low pass filter 100 removes all of the high-speed information which is of no value and that could destabilize the system. Also, note that statistically half of the RZ signal SP2 (e.g., Ethernet RZ pulses) are missing (for logic "0's"); the low pass filter is need to "smooth over" these gaps.

In an example embodiment, an analog-to-digital (AD) converter 101 is arranged between low-pass filter 100 and controller 80 to create digital signals SC from analog signals SC in the case where controller 80 is a digital device.

Based on the information in signal SC, controller 80 controls variable delay 70 via a control signal S5 to form coincident signal PN1'. Signal PN1' is sent over line 72 to control the operation of gate 40. In other words, coincident signal PN1' is used as a gating signal to control the operation of gate 40.

If the output signals (pulses) PN1' from variable delay 70 and the RZ Ethernet pulses SP2 are in phase, then the multiplier output signal SC will be at a maximum. In an example embodiment, the cross-correlation of multiplier 90 is averaged over a time period greater than a 10 MHz clock period (100 nanoseconds).

When signal SC is maximized, the pulses in delay output signal PN1' coincide with the Ethernet RZ pulses SP2. Controller 80 can therefore send these coincident pulses over line 72 to gate 40 to enable the gated detection of the optically amplified electrical public channel signal SP2.

If, during the gating signal PN1' at line 72, a pulse is found at the output (line 82) of gate 40, then the result is an Ethernet logical "1". If, during the gating signal PN1' at line 72, no pulse is found at the output of the gate, then the result is an Ethernet logical "0". The train of Ethernet logical "1's" and "0's" are then serially combined to produce a Manchester-encoded signal SP2 that can be processed by standard, commercially available Ethernet integrated circuits.

The conversion from the narrow RZ pulses to the wide Manchester-encoded pulses required by the 10 MHz Ethernet standard is performed by a decoder 110 coupled to the output of gate 40. This describes the required receiver. Decoder 110, in turn, is coupled to an Ethernet port EP2 or other like device.

Bi-Directional Public Channel Communication

FIG. 1 shows an example of a T-R system 2 by which Manchester-coded public channel data flows from transmitter T to receiver R as signal SP1. However, for bi-directional operation of the public channel, another set of transmitters and receivers is needed to carry data the other way.

Accordingly, FIG. 2 is a schematic diagram illustrating an example implementation of a QKD system with QKD stations Alice and Bob, each having a transmitter T and a receiver R as illustrated in FIG. 1, thereby enabling Alice and Bob have bi-directional public channel communication. Specifically, Alice has a transmitter T1 and a receiver R2, and Bob has a transmitter T2 and a receiver R1, so that two T-R systems—T1-R1 and T2-R2 are present.

Alice is coupled to Ethernet port EP1 while Bob is coupled to Ethernet port EP2. In the example QKD system of FIG. 2, the quantum signal SQ and the sync signal SC travel in one direction from Alice to Bob, while the public channel signal SP1 travels bi-directionally from Alice to Bob and from Bob to Alice.

With reference again to FIG. 1, in an example embodiment, controller 80 in receiver R includes programmable logic (e.g., a logic-programmed FPGA) adapted to determine the peak (maximum) of the averaged cross-correlation function signal SC. Once the peak is found, it keeps the delay matched to the incoming pulse train PN1 so that the peak is maintained over time, even in the face of varying influences such as temperature fluctuations.

The coincident gating of the detection of the public channel signal serves to drastically reduce the amount of noise in the public channel detection process. This allows the optical power level of the optical public channel signal SP1 to be reduced to the point that it can coexist on the same optical fiber as the quantum and/or the sync channels.

The present invention is described above in connection with a 10 MHz Ethernet signal as an example embodiment of public channel signal SP1. However, the present invention is applicable to most any kind of data transmission at most any data rate. For instance, Sonet, 100 MHz Ethernet, 1G Ethernet, etc. would all apply. Also mentioned above is Manchester encoded data, but the present invention is not so limited and would apply, for example, to 8B/10B coding and most any other type of coding.

Further, the present invention is generally applicable to QKD systems, (including one-way and two-way QKD systems) and generally to telecommunication applications. In particular, although the method is eminently suited for multiplexing weak (single-photon) optical signals with relatively strong Ethernet optical signals, it can be applied to cases involving Ethernet signals only. The present invention can be applied to situations wherein a standard Ethernet signal has to travel longer distances than anticipated, resulting in having to detect a relatively weak Ethernet signal. The present invention can thus be used to increase the detectability of the weakened Ethernet signal without the need for amplification.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of sending a public channel signal (SP1) and a quantum channel signal (SQ) over an optical fiber connecting first and second quantum key distribution (QKD) stations, comprising:

a) at the first QKD station: generating signal SQ signal and generating SP1 in a return-to-zero (RZ) format, and transmitting signals SP1 and SQ over the optical fiber to the second QKD station;

b) at the second QKD station: demultiplexing signals SP1 and SQ; optically amplifying signal SP1 to form an amplified signal SP1*; detecting and processing amplified signals SP1* to form a frequency-locked gating signal; and using the frequency-locked gating signal to gate further detection of signals SP1* so as to reduce public channel signal detection noise; and c) detecting signal SP1* to create a public channel electrical signal SP2; forming from signal SP2 a signal PN1' that comprises electrical pulses that are frequency locked and that are coincident in time with signal SP2, and using signal PN1' to gate the detecting of signals SP1*, including forming signal PN1' by sending signal SP2 through a narrow bandpass filter of bandwidth of 10 MHz to create a sine-wave signal S3 that is frequency locked to signal SP2, passing signal S3 through a comparator to create a square-wave signal S4, forming signal PN1 by passing signal S4 through a multi-vibrator, and passing signal PN1 through a delay controlled by a controller adapted to provide signal PN1 with a time delay in forming said coincident signal PN1'.

2. The method of claim 1, wherein the public channel signal is a 10 MHz Ethernet signal and the narrow bandpass filter has a bandwidth of 10 MHz.

3. The method of claim 1, wherein passing signal PN1' through the delay includes:

passing signal PN1 through a variable delay line; and
   controlling the variable delay line with the programmable controller.

4. The method of claim 3, including providing the controller with a cross-correlation signal SC that provides information about an amount of delay to be provided by the variable delay line.

5. The method of claim 4, including providing the controller with a field-programmable gate array (FPGA) programmed with logic adapted to find an amplitude maximum SCmax in cross-correlation signal SC.

* * * * *